United States Patent [19]

Priceman

[11] 3,926,574

[45] Dec. 16, 1975

[54] MOLYBDENUM BASED SUBSTRATE COATED WITH HOMOGENEOUS MOLYBDENUM TRIALUMINIDE

[75] Inventor: Seymour Priceman, Seaford, N.Y.

[73] Assignee: DeWiant Corporation, Detroit, Mich.

[22] Filed: June 21, 1971

[21] Appl. No.: 155,228

[52] U.S. Cl. .................................... 29/197; 29/198
[51] Int. Cl.² .......................................... B32B 15/00
[58] Field of Search .............................. 29/198, 197

[56] References Cited
UNITED STATES PATENTS

| | | | |
|---|---|---|---|
| 2,711,973 | 6/1955 | Wainer | 29/198 |
| 2,772,985 | 12/1956 | Wainer | 29/198 |
| 2,788,289 | 4/1957 | Deuble | 29/198 |
| 2,788,290 | 4/1957 | Deuble | 29/198 |
| 3,044,156 | 7/1962 | Whitfield | 29/198 |
| 3,668,391 | 6/1972 | Kimball | 313/315 |

*Primary Examiner*—L. Dewayne Rutledge
*Assistant Examiner*—Arthur J. Steiner
*Attorney, Agent, or Firm*—Lane, Aitken, Dunner & Ziems

[57] ABSTRACT

Composites are disclosed consisting essentially of molybdenum-based substrates and a relatively thin, uniform continuous coating of molybdenum aluminide metallurgically bonded to the substrate. A process for producing these composites consists essentially of surrounding an uncoated substrate with a dry three-component relatively uniform admixture of aluminum powder, a volatile halide salt and a major amount of aluminum oxide, heating the admixture and the substrate in an inert or reducing atmosphere at a temperature of about 1040°C for at least about 2 hours.

5 Claims, No Drawings

MOLYBDENUM BASED SUBSTRATE COATED WITH HOMOGENEOUS MOLYBDENUM TRIALUMINIDE

CROSS-REFERENCE TO RELATED APPLICATION

U.S. Patent Application Ser. No. 65,076 filed Aug. 19, 1970 now U.S. Pat. No. 3,668,391 and assigned to the same assignee of this invention, there is disclosed lamps employing certain lead-in wires. The lead-in wires are specific embodiments of the composites which gave unexpected improvements in quartz-halogen lamps. This invention is not so limited and can be used in other applications.

BACKGROUND OF THE INVENTION

The invention relates to composites having a molybdenum based substrate and metallurgically bonded thereto a thin uniform coating of molybdenum trialuminide.

Molybdenum and molybdenum based alloys are often used in various devices as lead-in wires because of their properties of electrical conductivity, low coefficient of expansion and high melting point. Often it is necessary to seal these materials to glass or quartz envelopes. Under high operating temperatures, the molybdenum external to the envelope seal reacts with oxygen in the air to form molybdenum trioxide. The oxidation of molybdenum causes an increase in volume of the metal which exerts pressure and can fracture the envelope.

Various coatings or claddings have been tried in the past to alleviate the condition. For example, a cladding of platinum is partially successful, however, it is very expensive and adds a significant cost to the resulting composite. Phosphide and silicide coatings are also partially successful in providing oxidation protection, however, the materials are not readily weldable. Also in the case of the silicide coating where 2 part molybdenum-nickel or molybdenum-iron leads are used the silicon reacts excessively with the nickel or iron.

Prior attempts to form aluminide coatings on molybdenum based substrates have resulted in relatively thick coatings, above 2 mils, which are unsatisfactory where quartz sealing is employed. In addition, methods heretofore known have not resulted in metallurgically homogeneous coatings. That is, either elemental aluminum or other molybdenum-aluminum compounds are formed as a part of the coating in addition to molybdenum trialuminide.

It is believed, therefore, that a composite which has the beneficial properties of molybdenum, is oxidation resistant at high temperature and is weldable to itself or bare molybdenum, is an advancement in the art. A relatively simple process for providing these new composites is also believed to be an advancement in the art.

OBJECTS AND SUMMARY OF THE INVENTION

It is an object of this invention to provide an oxidation resistant composite having the beneficial properties of molybdenum based materials.

It is a further object of this invention to provide a composite of a molybdenum-based substrate and a relatively thin, metallurgically homogeneous layer of molybdenum trialuminide metallurgically bonded thereto.

It is another object of this invention to provide a process for coating molybdenum-based materials with an oxidation-resistant material.

It is an additional object of this invention to provide a molybdenum based composite having improved welding characteristics.

In accordance with one aspect of this invention there is provided a composite consisting essentially of a molybdenum based substrate and metallurgically bonded thereto a relatively thin, metallurgically homogeneous layer of molybdenum trialuminide.

In accordance with an additional aspect of the invention there is provided a process for producing a composite having a molybdenum trialuminide layer bonded thereto. The process comprises surrounding the molybdenum substrate with a relatively uniform admixture consisting essentially of a major portion of aluminum oxide, up to about 2% by weight of powdered aluminum and less than about 0.25% of a volatile halide salt, heating in an inert or reducing atmosphere at a temperature of at least 900°C for at least about 2 hours.

For a better understanding of the present invention, together with other and further objects, advantages, and capabilities thereof, reference is made to the following disclosure in connection with the above description of some of the aspects of the invention.

DESCRIPTION OF PREFERRED EMBODIMENTS

Molybdenum based substrates, as used herein, encompasses not only molybdenum metal but also alloys of molybdenum such as molybdenum-titanium, molybdenum-titanium-zirconium and the like. Composites of this invention are formed from those materials having a molybdenum content of from 65 to 100% by weight. The substrate can also consist of 2 parts of different metals or alloys joined together e.g. a combination lamp lead which is one-half molybdenum and the other half is iron, nickel or cobalt or an alloy thereof.

The thickness of the molybdenum trialuminide layer is generally from about 0.3 to 1 mil thick. It is uniformly deposited both physically and chemically. Deviations from the thickness are generally less than 0.1 mil and the coating is essentially molybdenum trialuminide $MoAl_3$. X-ray diffraction analyses do not detect any of the original coating materials or by-products. Thus, the layer can be described as single phase molybdenum trialuminide.

In the process of this invention a "pack cementation" process is used which is a form of chemical vapor deposition. The "pack mix" or the raw materials used consist essentially of a relatively uniform admixture of aluminum oxide as the major ingredient, from about 1% to about 2% of aluminum powder and from about 0.1% to about 0.25% of a volatile halide salt.

The molybdenum-based substrate is surrounded by the pack mix and thereafter heated in an inert or reducing atmosphere at a temperature of at least about 900°C. Although temperatures up to about 1400°C can be used, it is preferred to use temperatures of from about 900°C to about 1100°C. In general, times required to form the layer of molybdenum trialuminide are shorter with high temperatures and times of at least about 3 hours at the lowest practical temperature is sufficient to form the layer. About two hours at about 1040°C is generally satisfactory. The halide salt or activator serves to transfer the coating element (aluminum) to the surface of the parts being coated (molybdenum substrate) by means of the following types of generalized reactions.

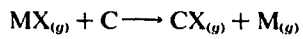

and

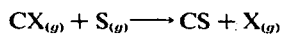

in which
M denotes the halide salt cation
X denotes the halogen
C denotes the coating element
S denotes the substrate material Ammonium chloride is a preferred activator for this process. Other suitable halide salt activators include NaF and KF.

The composites of this invention are oxidation resistant even at temperatures of up to about 1750°C which are used to seal the composites into quartz envelopes. In forming a seal in an envelope generally, alloy foils are used which are matched with the particular envelope material, and the composite is thereby sealed into the envelope. The composites of this invention can be welded to the foil without the use of platinum paste or other bonding agents and with no loss of protectiveness of the molybdenum trialuminide layer.

While there has been shown and described what is at present considered the preferred embodiments of the invention, it will be obvious to those skilled in the art that various changes and modifications may be made therein without departing from the scope of the invention as defined by the appended claims.

What is claimed is:

1. A composite consisting essentially of a molybdenum based substrate and metallurgically bonded to said substrate a relatively thin, metallurgically homogeneous layer of molybdenum trialuminide.

2. A composite according to claim 1 wherein said layer has a thickness of from about 0.3 to about 1 mil.

3. A composite according to claim 2 wherein said substrate is molybdenum metal.

4. A composite according to claim 2 wherein said substrate is a molybdenum base alloy.

5. A composite according to claim 4 wherein said alloy is selected from the group consisting of molybdenum-titanium alloys and molybdenum-titanium-zirconium alloys.

* * * * *